(12) United States Patent
Summer et al.

(10) Patent No.: US 7,339,340 B2
(45) Date of Patent: Mar. 4, 2008

(54) CONTROL SYSTEM AND RELATED METHOD FOR MULTI-LIMBED, MULTI-LEGGED ROBOT

(75) Inventors: Matthew D. Summer, Melbourne, FL (US); Robert F. Varley, Melbourne, FL (US); Laurance H. Davis, III, Malabar, FL (US); James A. Stiver, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/205,384

(22) Filed: Aug. 17, 2005

(65) Prior Publication Data

US 2006/0214622 A1    Sep. 28, 2006

Related U.S. Application Data

(60) Provisional application No. 60/664,596, filed on Mar. 23, 2005.

(51) Int. Cl.
B25J 5/00 (2006.01)

(52) U.S. Cl. .................................. 318/568.12; 700/254
(58) Field of Classification Search ........ 318/560–650; 700/245
See application file for complete search history.

(56) References Cited

U.S. PATENT DOCUMENTS

| | | | |
|---|---|---|---|
| 5,151,859 A | 9/1992 | Yoshino et al. ........ 364/424.02 |
| 5,206,569 A | 4/1993 | Ozawa ................... 318/568.12 |
| 5,241,875 A | 9/1993 | Kochanneck ................. 74/479 |
| 5,252,901 A | 10/1993 | Ozawa et al. .......... 318/568.12 |
| 5,311,109 A | 5/1994 | Ozawa ................... 318/568.11 |
| 5,343,397 A | 8/1994 | Yoshino et al. ........ 364/424.02 |
| 5,349,277 A | 9/1994 | Takahashi et al. ...... 318/568.12 |
| 5,355,064 A | 10/1994 | Yoshino et al. ........ 318/568.12 |
| 5,432,417 A | 7/1995 | Takenaka et al. ....... 318/568.12 |
| 6,064,167 A * | 5/2000 | Takenaka et al. ...... 318/568.12 |
| 6,243,623 B1 | 6/2001 | Takenaka et al. ........... 700/245 |
| 6,289,265 B1 * | 9/2001 | Takenaka et al. ........... 700/245 |
| 6,301,524 B1 | 10/2001 | Takenaka ..................... 700/245 |
| 6,567,724 B2 * | 5/2003 | Yamamoto ................... 700/261 |
| 6,588,701 B2 | 7/2003 | Yavnai ...................... 244/23 A |
| 6,697,709 B2 | 2/2004 | Kuroki et al. ............... 700/245 |
| 6,705,917 B2 * | 3/2004 | Filo ............................ 446/379 |
| 2004/0176875 A1 | 9/2004 | Iribe et al. .................. 700/245 |
| 2005/0055131 A1 | 3/2005 | Mikami et al. ............. 700/245 |

* cited by examiner

Primary Examiner—Lincoln Donovan
Assistant Examiner—Erick Glass
(74) Attorney, Agent, or Firm—Allen, Dyer, Doppelt, Milbrath & Gilchrist, P.A.

(57) ABSTRACT

A robot body includes a front half and rear half and a rotatable and driven articulating joint interconnecting the front half and rear half. Multi-limbed legs extend from the robot body and are adapted to engage a ground surface to form a support polygon for each half and for the robot body. A controller is operative with each leg for determining the position and orientation of the robot body with respect to a support polygon, mapping the posture of the robot body with respect to the ground surface via the articulating joint, and determining a direction and magnitude of locomotion and translating a trajectory of locomotion to specific limb motions for each leg.

26 Claims, 5 Drawing Sheets

CONTROL SYSTEM AND RELATED METHOD FOR MULTI-LIMBED, MULTI-LEGGED ROBOT

RELATED APPLICATION

This application is based upon prior filed copending provisional application Ser. No. 60/664,596 filed Mar. 23, 2005.

FIELD OF THE INVENTION

The present invention relates to remotely controlled robots, and more particularly, the present invention relates to remotely controlled multi-limbed, multi-legged robots.

BACKGROUND OF THE INVENTION

The field of mobile robotics has witnessed several leaps in technological advancements in recent years. Most notable in these advances are the attempts at biomimetic systems, which take their design cues from nature, and attempt to design robots that mimic humans or insects. Design examples for such robots include everything from cockroaches to humans and many species in between. To date, most biped (or humanoid) type robot systems have not demonstrated a high degree of success when traversing rough or unknown terrain. The ambulation control used for mimicking humanoid limbs, body motion and balance is extremely sophisticated and complex. Most of these robots are limited to substantially flat surfaces. The kinematics of these robots are elegant and incorporate whole body dynamic balancing in conjunction with whole body momentum control. The processing necessary for controlling such systems is complicated.

Conversely, certain insect based multi-limbed, multi-legged robots tend towards high-speed locomotion with more simple control systems. These robots have demonstrated high speed and robustness over abstract terrain by using low-level controllers based on reflex methods and tuned passive dynamic elements.

Both biped (or humanoid) and insect type robots have strengths and weaknesses with respect to applicable missions. Biped robots have smooth kinematics while lacking inherent stability, resulting from an inverted pendulum problem facing researchers. Despite these difficulties, advanced control algorithms and mechanisms are daily gaining maturity. Multi-limbed, multi-legged robots, typically with six or more legs, exhibit high stability properties even while in motion. It is desirable if the combined strengths of modern control theory and intelligent mechatronic design could be used to develop a multi-limbed, multi-legged robot that is functional today outside of a laboratory.

SUMMARY OF THE INVENTION

In view of the foregoing background, it is therefore an object of the present invention to provide a multi-limbed, multi-legged robot that has enhanced control over locomotion and can fit and move in confined or difficult to reach spaces.

This and other objects, features, and advantages in accordance with the present invention are provided by a robot that includes a robot body having a front half and a rear half. A rotatable and driven articulating joint interconnects the front half and rear half. A plurality of multi-limbed legs extend from each half and each leg includes a foot adapted to engage a ground surface and form a support polygon for each half and for the robot body. Each leg has driven limbs and joints to form a multi-limbed leg. A controller is operative with each leg for determining the position and orientation of the robot body with respect to a support polygon. The controller maps the posture of the robot body with respect to the ground surface via the articulating joint while maintaining ground contact for each foot that contributes to a support polygon. The controller is also operative for determining a direction and magnitude of locomotion and translating a trajectory of location for the robot body to specific limb motions in each leg for allowing movement of the robot body over a ground surface.

In another aspect, the articulating joint is operative for rotation about the axes of an x,y,z coordinate system with joint angles that are a function of a current support polygon. Each multi-limbed leg comprises limbs and joints forming a hip joint, a knee joint and a shin and foot assembly. A force sensor is positioned at each leg and operatively connected to the controller for estimating contact forces on each leg. Each foot is preferably substantially spherical in configuration at a lower end engaging a ground surface to permit the estimation of radial reaction forces with respect to each leg.

In another aspect, the controller is operative for computing a real-time estimate of the ground surface and configuring the front half and rear half of the robot to the ground surface via rotation about the articulating joint. The controller is also operative for comparing a foot position matrix and commanded heading for each leg to determine which foot is positioned farthest from a trajectory. In yet another aspect, the controller is operative for commanding a leg to lift a foot to a fixed reference point with respect to the x,y,z coordinates to bound integral step errors.

In another aspect, an accelerometer is carried by the robot body and operatively connected to the controller for imparting signals representative of motion during rough terrain robot body movement. In response, the controller is operative for adjusting specific limb motions in each leg to compensate for rough terrain robot body movement. This accelerometer, in one aspect, is formed as a MEMS accelerometer.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
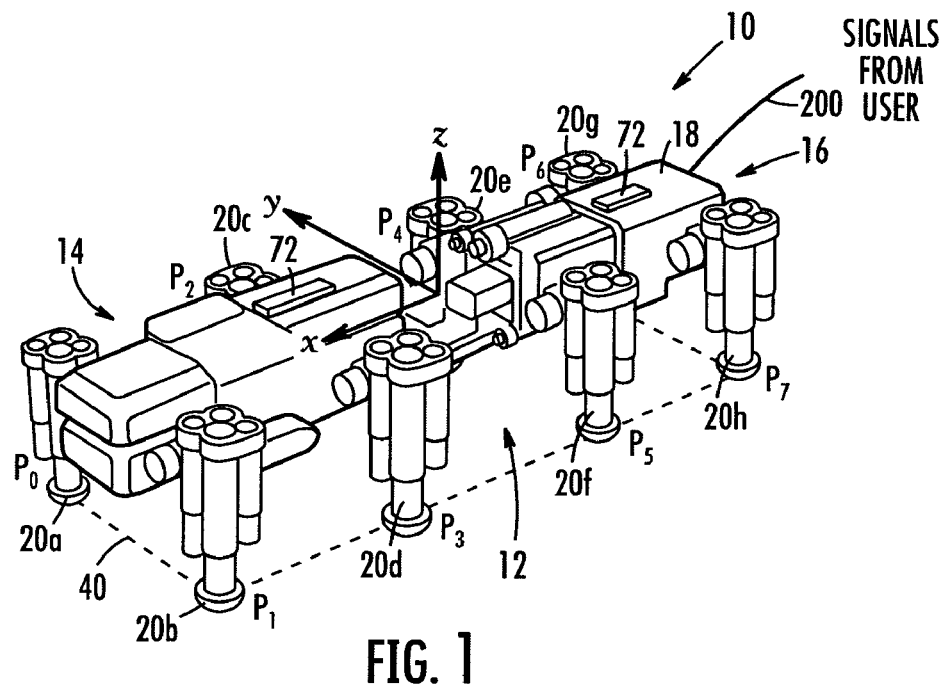
FIG. 1 is an isometric view of a multi-limbed, multi-legged robot in accordance with one example of the present invention.

FIG. 1 is an isometric view of a multi-legged, multi-limbed walking robot 10 in accordance with one non-limiting example of the present invention. Although eight legs are illustrated, different numbers of legs can be used. The robot 10 has a central articulating joint 12 that defines a front half 14 and a back half 16 of the robot body 18, with four legs at each half. In this design, a minimum of three legs would form a support polygon and when the articulating joint is active and rotated, legs in each half could form a separate support polygon for the respective half. Although eight legs 20a-h are illustrated and labeled P0-P7, use of a different number of legs is possible. Each half 14,16 having four legs provides balance.

This robot 10 has a unique mechanism, which allows for robust mobility over rough terrain, and can vertically climb when positioned between opposing surfaces because of the support polygons formed at each half and use of the articulating joint 12. Mobile performance is improved by using the actuated three degree-of-freedom (DOF) articulating joint 12.

FIG. 1 is an isometric view of the multi-limbed, multi-legged robot 10, in accordance with one example of the present invention, and shows the articulating joint 12 and eight legs 20a-h connected to the body with four legs at each half 14,16 to provide X, Y and Z movement through the articulating joint 12 and the legs. As will be explained in detail below, this robot 10 has a layered behavioral controller system with a goal based step generator, a force estimator loop and real-time terrain conforming and pseudo-stability locomotion core. It has a six degree of freedom analog body trajectory that retains a fixed ground contact and stability, and real-time gait generation based on trajectory goals. Biological gaits can emerge from this architecture.

The robot 10 preferably has an omni-directional motion over abstract terrain to allow a smooth six degree of freedom balance over a footprint fixed in the world-base. It has a dynamically configurable pose for environment obstacle avoidance with intuitive and effector manipulation without additional mechanism actuation requirements. The architecture used in this robot 10 as described could be valid for any multi-legged robot, and is advantageous over predefined or hard-wired gaits that lead to flailing, which yields noise, environment disturbance and other factors.

Figure 2:
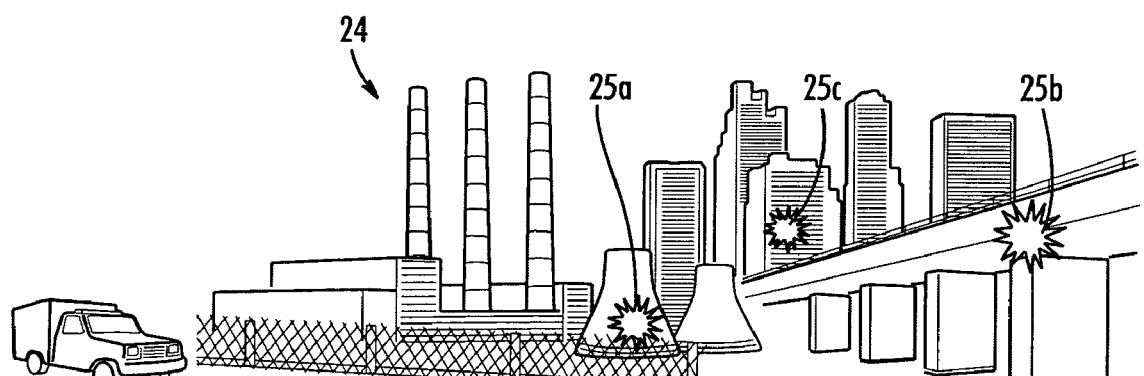
FIG. 2 is an overall environmental view of a city backdrop showing potential target sights resulting from terrorism, natural disaster or industrial accidents, in which an example of the robot such as shown in FIG. 1 is suited for search and rescue in this type of decaying urban setting.

The robot as described can be used in decaying urban settings, such as shown in the general environmental view of a city backdrop 24 in FIG. 2, which shows various targets, for example, a power plant 25a, bridge 25b or building 25c. The robot 10 would be especially applicable for emergencies such as industrial accidents, natural disasters and acts of terrorism. It is capable of search and rescue in these decaying urban settings because of its inherent dexterity and small form factor. In small spaces, such as crawl spaces and pipes with opposing walls, it can climb vertically.

The mechanisms controlling this robot 10 have been designed with system modularity in mind. The eight leg assemblies 20a-h are substantially identical in hardware, leading to reduced system costs, component validation, and integration efforts. Different types of motors could be used, but a mix of 13 mm and 16 mm brushed DC motors has been found acceptable. These motors yield high performance in a small, easily controllable package. The structure of the robot body 18 is formed primarily from 6061-T6 aluminum, and CRES or titanium components are used only where stiffness or additional strength is required. Additional system and joint mechanism parameters for the robot are detailed in Tables I and II, which represent non-limiting examples of the parameters that could be used for the robot 10. Naturally, other parameters could be chosen based on robot design specifications.

TABLE I

SYSTEM PARAMETERS

|  | Leg | Articulating Joint | RIDES Total |
| --- | --- | --- | --- |
| DOF (#) | 3 | 3 | 27 |
| Motors (#) (#) (r) | 3 | 4 | 28 |
| Motor (Watts) | 3.7 | 4.4 | 34 |
| Servos (Watts) | 1.67 | 1.67 | 15 |
| Mass (kg) | 0.52 | 0.87 | 6.8 |

TABLE II

JOINT MECHANISM PARAMETERS

| | Joint | | |
| --- | --- | --- | --- |
| Parameter | q1 | q2 | q3 |
| Cont. Torque (N-mm or N) | 5.0 | 3.0 | 3.0 |
| Stall Torque (N-mm or N) | 28.8 | 8.8 | 8.8 |
| Range of Motion (° or mm) | 0-360 | +45/−30 | 0-48.2 |
| Ratios (turn/turn or turn/mm) | 2730 | 5775 | 11.1 |
| Max Velocity (°/s or mm/s) | 25.8 | 9.0 | 19.0 |
| Mechanical Efficiency (%) | 31 | 30 | 47 |

Figure 3:
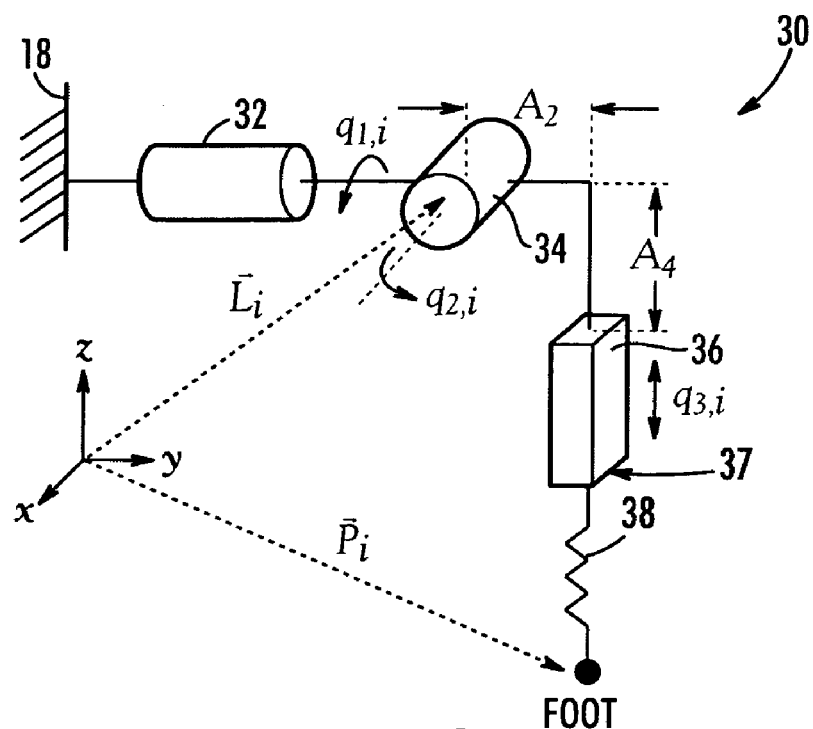
FIG. 3 is a force diagram showing the mechanical linkage and kinematic parameters of a leg used in the robot such as shown in FIG. 1.

The inverse kinematics for the robot lack singularities and may be found from a matrix comprised of the set of leg position vectors which defines all joint angles of the system. This matrix is given as:

$$P = [\vec{P}_0 \; \vec{P}_1 \; \ldots \; \vec{P}_7]$$

where $\vec{P}_1$ is defined in FIG. 3.

FIG. 3 shows a fragmentary force diagram of the mechanical linkage 30 used in each multi-limbed legs 20a-h, and the kinematic parameters of an $i^{th}$ leg are defined as shown in FIG. 3. As illustrated, the kinematic equivalents for a leg 20 are a hip joint 32 that is connected to both the robot body 18 and a knee joint 34, which in turn, is connected to a shin/foot assembly 36 and operative with a force sensor 37. The force sensor uses a linear displacement sensor to measure a spring 38 deflection. The spring rate is known, and therefore, the force can be estimated.

There exists within P a vector set that is the idealized stable pose for the robot given as:

$$R = [\vec{R}_0 \vec{R}_1 \ldots \vec{R}_7]$$

where the columns are the "best stability" foot position vectors.

At any given time in this non-limiting example of the robot 10, n feet are touching the ground, where $4 \leq n \leq 8$ in this particular non-limiting example shown in FIG. 1 where eight legs are illustrated. These feet, commanded to remain in contact with the ground, form a support polygon as shown by the dashed lines 40 in FIG. 1, and the two support polygons 42a, 42b for each half 14,16 as shown by the dashed lines in FIG. 8. This set is denoted as the nonzero columns of $P_\eta$, where $\eta$ is defined as follows:

$$\eta = \text{diag}(\eta_0 \eta_0 \ldots \eta_\tau)$$

The diagonal elements of $\eta$ are the Boolean values representing commanded foot/ground contact (1 for contact, 0 for free air). For example, if the $i^{th}$ foot is commanded to support the robot, thus $\eta_{ii}$ has a value of 1.

The inverse kinematics for each leg are defined as follows:

$$q_{1,i} = \pi - \tan^{-1}\left(\frac{[1\ 0\ 0]\overline{x}}{[0\ 0\ 1]\overline{x}}\right)$$

$$q_{2,i} = -\sin\left(\frac{A^2}{\|\overline{x}\|}\right) + \cos^{-1}\left(\sqrt{\overline{x}^T \begin{bmatrix} 1 & 0 & 0 \\ 0 & 0 & 0 \\ 0 & 0 & 1 \end{bmatrix} \overline{x}} \Big/ \|\overline{x}\|\right)$$

$$q_{3,i} = \sqrt{\|\overline{x}\|^2 - A_2^2} - A_2 \text{ where}$$

$$\overline{x} = \begin{cases} R_{ART}[\overline{P}_i - \overline{L}_i] \Leftrightarrow i = 0 \ldots 3 \\ \overline{P}_i - \overline{L}_i \Leftrightarrow i = 4 \ldots 7 \end{cases}$$

and $R_{ART}$ is the orthogonal rotation matrix of the articulating joint 12, located at the (X, Y, and Z) origin for robot 10 as shown in FIG. 1. The articulating joint 12 enables Euler rotations about the axes of the coordinate system (X, Y, and Z). Joint angles for the articulating joint 12 are determined as a function of the current support polygon.

Joint angles overall for the robot 10 are controlled by hardware analog control loops in one non-limiting example. Position feedback for each joint, such as in the articulating joint 12 and the legs 20 and its joints, could come from a potentiometer with bipolar DC rails. Velocity feedback can be provided by a pseudo-tachometer, where angular velocity is determined from the induced back-EMF. A current controlled amplifier would drive the motors in one non-limiting example.

Figure 4:
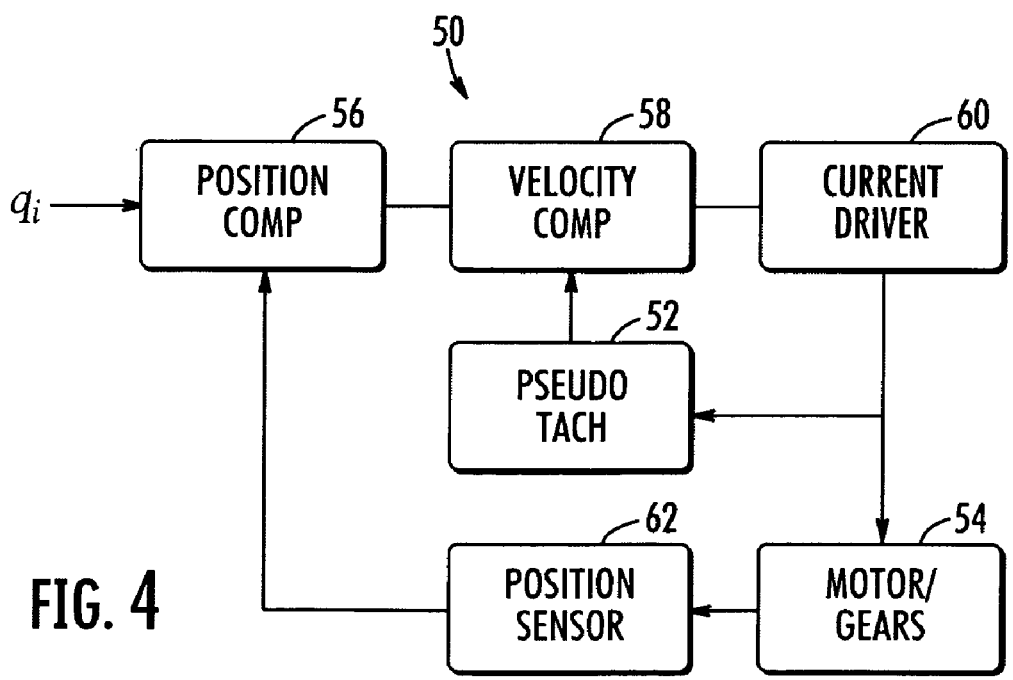
FIG. 4 is a block diagram showing an example of the various control systems and analog server control loops that are used in a controller for the robot shown in FIG. 1.

FIG. 4 is a non-limiting high level block diagram of an example of a controller system 50 that can be used for the robot 10, illustrating the different functional components and analog server control loops for each of the degrees of freedom used in the robot 10. A pseudo-tachometer 52 is operative from the back electromotive force (EMF) of the motor/gears 54 as illustrated. A position comparator 56, velocity comparator 58 and current driver 60 are operative with the psueudo-tachometer 52, motor/gears 54 and a position sensor 62 as illustrated with the position sensor and pseudo-tachometer as part of the analog control loops.

Figure 5:
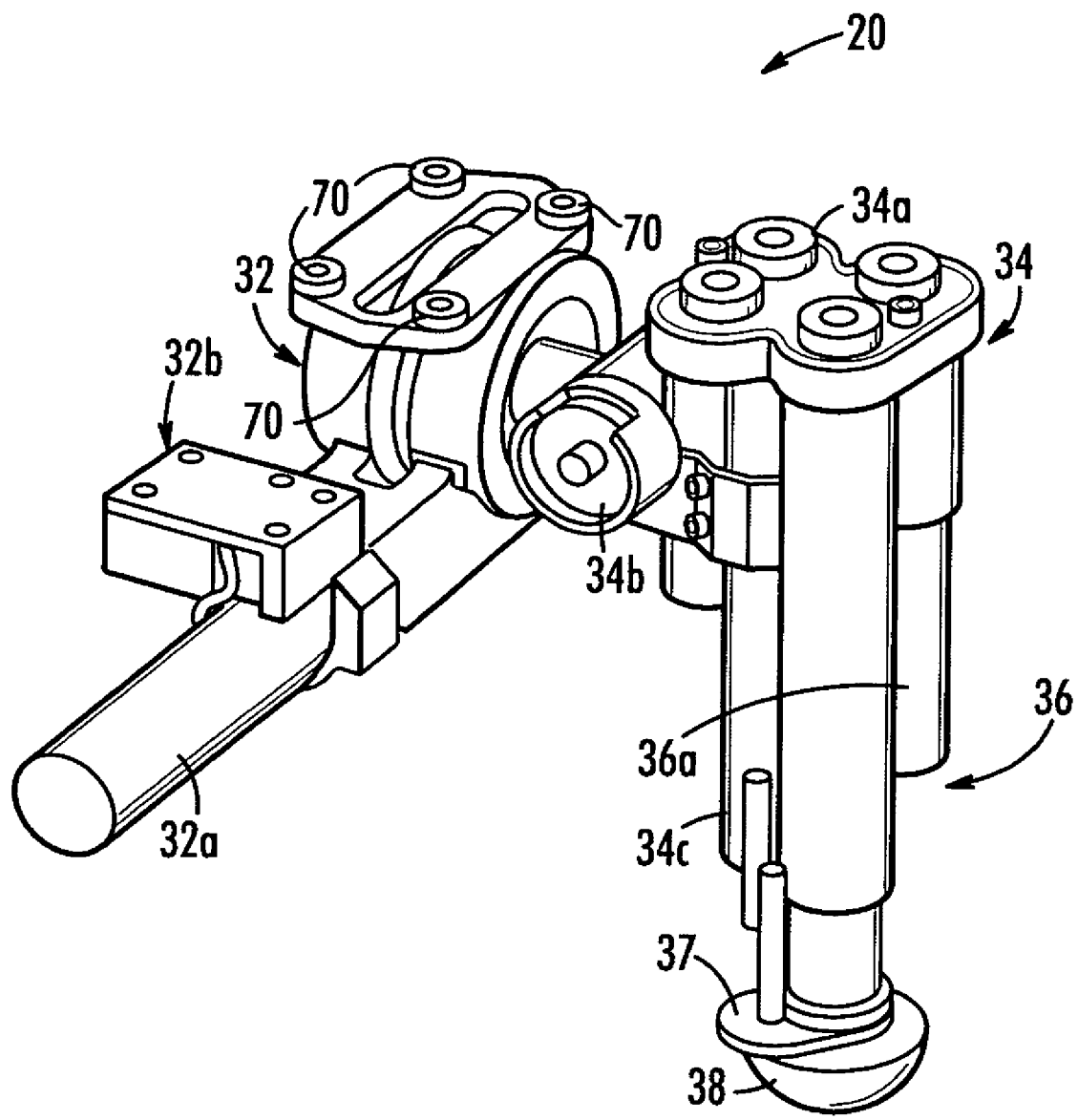
FIG. 5 is an isometric view of a multi-limbed leg showing different components of the leg as used in the robot such as shown in FIG. 1.

FIG. 5 is an isometric view showing an example of a leg 20 that is typically electrically and mechanically substantially identical to other legs. The leg 20 functions kinematically similar to the leg illustrated in the force diagram of FIG. 3. The leg 20 attaches to the robot body 18 through the body or leg attachment points 70, for example, by using appropriate fasteners. The hip joint 32, knee joint 34, and shin joint 36 (also referred to as the shin and foot assembly) are illustrated in FIG. 5. Each joint includes a respective motor 32a, 34a, 36a for powering joint rotation and movement. Respective potentiometers 32b, 34b, 36b allow control over the motors 32a, 34a, 36a. The controller 50 with respective analog feedback control and associated hardware and software permits control over the leg 20 as explained in greater detail below. The force sensor legged 37 is positioned at the shin 36 for sensing foot contact and operative with the controller 50.

The hip $q_1$ (32) and knee $q_2$ (34) joints are revolute while the shin $q_3$ (36) is prismatic with its attached single-axis force transducer 37, and as such, the foot/shin assembly 36 is modeled as a series elastic actuator. The force sensor 37 is incorporated on each leg and provides estimated contact force and compliance between the robot body 18 and the ground. Radial reaction forces on each foot 36 are estimated based on the spherical geometry of its rubber feet 38, which have a spherical lower segment, for example, configured as a half-sphere as illustrated. It has been demonstrated that the single-axis force sensors, in conjunction with accurate proprioception, are sufficient to estimate the static reaction loads on the support polygon 40.

In one non-limiting example, a three-axis microelectromechanical (MEMS) accelerometer 72 has been incorporated onto the structure of the robot to aid in rough terrain stability and determine the various acceleration forces constantly buffering the robot in rough terrain travel. One or more accelerometers 72 could be used, and in this embodiment, two accelerometers 72 are illustrated, one for each half 14,16. The measured unit vector $\vec{g}$ points in the direction of the sensed gravitational field. High frequency disturbance of shock and vibration encountered during walking are filtered out to minimize pose corruption and wasted power.

The robot 10 has a deformable rigid robot body 18 connected to the world via redundant serial chains. This allows the robot body 18 to move in full, six degrees of freedom (DOF) with respect to the world. The benefits include:

1) Dynamically configurable pose for environment obstacle avoidance. i.e., adjusting walking height and/or inclination to fit within new constraints;

2) Intuitive end effecter manipulation without additional mechanism actuation requirement;

3) Ability to find true "best stability" for the given support polygon; and

4) Omni-directional motion over an abstract terrain.

Figure 6A:
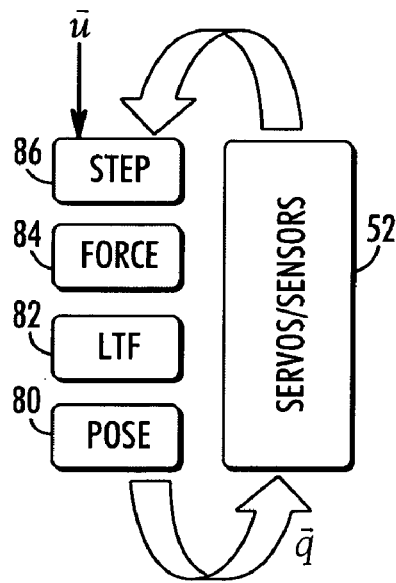
FIG. 6A is a block diagram showing the different hierarchical layers of a controller that is used in accordance with one example of the present invention.

FIG. 6A shows a hierarchical layer of control for the various functions of the controller 50 and shows how the servomotors and various sensors, shown collectively at 52, are operative with the pose control 80 as a first layer function operative with the localized terrain follower (LTF) layer 82, the force controller layer 84 as a next level function and operative with the highest function, the step generator layer 86 function, all operable in a hierarchy with the various servomotors, sensors, and other components.

Figure 6B:
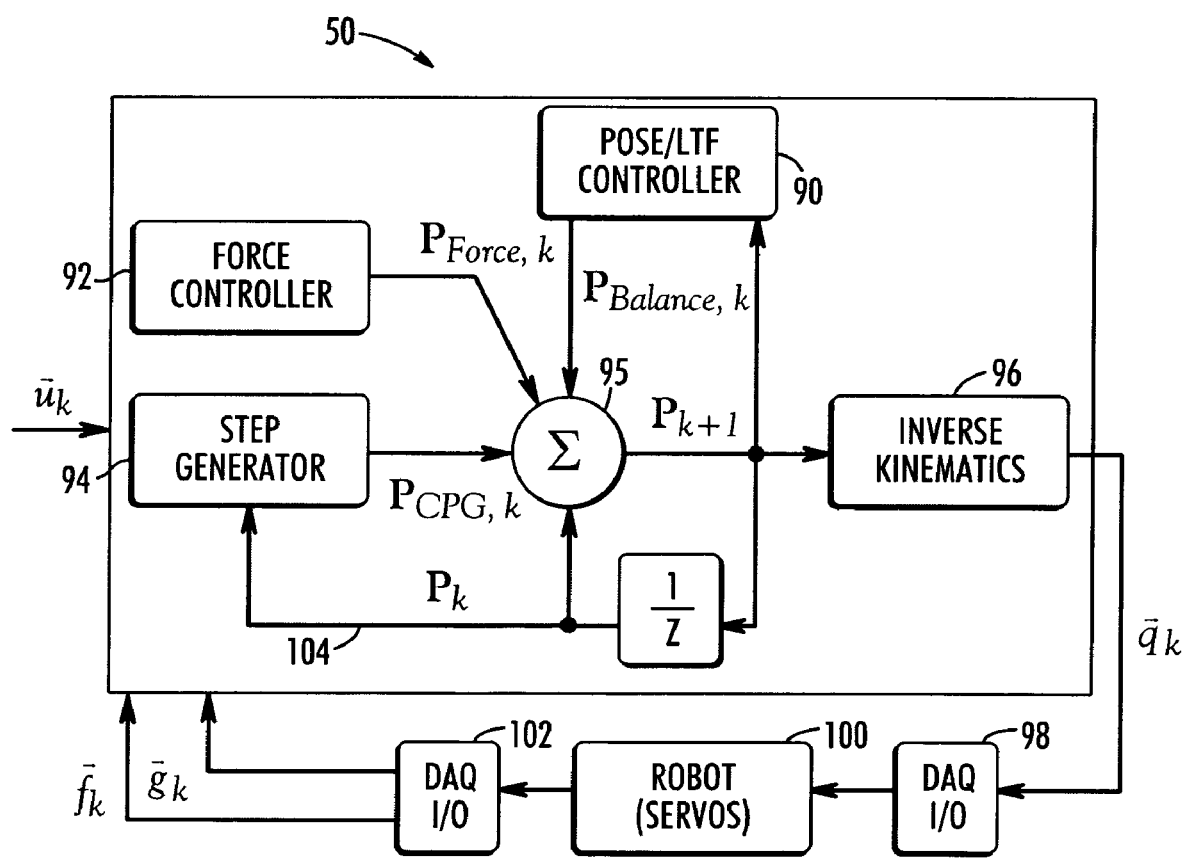
FIG. 6B is a block diagram showing different functional components of a controller that is used in accordance with one example of the present invention.

FIG. 6B shows a block diagram of the controller 50 with signal inputs from a pose/LTF controller 90 operative with the pose control layer 80 and local terrain follower layer 82. Signal inputs also include signals from a force controller 92 operative with the force control layer 84, and step generator 94 and operative with the step generator function 86. These inputs are summed at summer 95 and output into inverse kinematics 96, and feedback to the data acquisition (DAQ) input/output 98, the robot servos 100 and again a data acquisition input/output 102. Feedback 104 occurs through another loop with an inverse function back to the summer 95 and step generator 94.

The controller 50 for the robot 10 is an adaptive hierarchical controller (FIG. 6A), with implicit position/velocity based force control, under compliant contact. The controller structure has four layers in this non-limiting example as set forth above. The most primitive of these layers is the pose control 80 that accounts for the robot's position and orientation with respect to a support polygon 40. Mobility typically relies on this layer. The second layer is the localized terrain follower (LTF) 82, which is transparent to the user, but extremely useful by mapping the posture of the robot body 18 to the terrain encountered via the articulating joint 12. The next layer is force control 84. This layer ensures that the feet contributing to the support polygon 40 maintain ground contact within specified limits. Finally, the step generator layer 86 takes input from the user to determine the direction and magnitude of locomotion and translates this trajectory to specific limb motions. The outputs of this step generator layer 86 are viewed as system disturbances with respect to the lower layers. The lower layers work to resolve the perceived disturbances in the pose and support polygon for the robot. The result is locomotion along the desired trajectory.

Three assumptions can be imposed for mathematical simplification and implementing ease of control as follows:

1) interactions between the ground and feet are considered static;

2) because of the small diameter of the hemispherical rubber feet, rolling without slipping is ignored; and 3) for the front and back halves 14,16 of the robot 10, the respective support polygons are approximated as two planes with normal vectors defined by $\vec{n}_f$ and $\vec{n}_b$ that satisfy the following over constrained system of equations:

$$p_f^T \vec{n}_f = [0\ 0\ 0]^T$$

$$p_b^T \vec{n}_b = [0\ 0\ 0]^T$$

The matrices $P_f$ and $P_b$ are the column sets of $\vec{P}_i$ contributing to the support polygon.

The controller 50 is shown in block diagram form in FIG. 6B and may be written formally as:

$$P_{k+1} = P_k + P_{CPG,k}(\bar{u}_k, P_{k-1}, \bar{g}_k, \eta_k) +$$
$$P_{Force,k}(\bar{g}_k, \eta_k) + P_{Balance,k}(R_{ART,k}, P_{k-1}, \bar{g}_k)$$

It is important to recognize that, despite the many influences on the next foot position matrix $P_{k+1}$, the instantaneous pose solution is stable and statically determinant. This can be largely attributed to the hierarchical layered nature of the controller 50 and the lack of reachable kinematic singularities.

Pose control is the fundamental system for stability and mobility. Six DOF pose error can be minimized and is a gradient written as:

$$E_{DOF} = \frac{\partial \sum_{i=0}^{2} \|\bar{P}_i - \bar{R}_i\|^2}{\partial DOF}$$

where $DOF = \{x\ y\ z\ \psi\ \theta\ \phi\}$.

Fusion of the additional sensory data from the accelerometers allows for true mass centered stability that is required for robust locomotion over rough terrain. Modifications can account for the articulating joint 12 and the improved gravity-based stability.

Applying the gravitational rotation matrix $R_g(\vec{g})$ yields a new minimized error equation given below, inclusive of the articulating joint 12:

$$E_{DOF} = \frac{\partial \sum_{i=0}^{2} \|R_g(\vec{\chi})\|^2}{\partial DOF}$$

The local terrain follower (LTF) layer 82 and associated pose/LTF controller 90 compute a real-time estimate of the walking surface and then "fit" the robot body 18 to that surface via the articulating joint 12. The LTF controller 82,90 ensures that the legs 20a-h are operating within the bounds of reachable workspace. Legs do not bottom out or become jammed due to positive or negative transitions in terrain. This level of control is implemented by applying an additional rotation matrix, $R_{ART}$, to the inputs of the lower layer controllers. The end result is a continuous smooth joint motion of all joints while maintaining static kinematic positions P in the world frame.

The force controller 92 reacts to the compliant environment via an implicit position/velocity based force control with soft contact. Some attempts had to made to calculate a real-time joint loading based on a sum of moments and forces about the center of gravity. These methods, however, were computation intensive and mostly unnecessary. Equivalent performance was found by using a simple proportional contact control with an adjustable dead band. With this method, all feet required to remain in contact with the ground were displaced in the direction of by $\vec{n}_f$ and $\vec{n}_b$ to control the reaction force. This method, while simple, has proved effective for the relatively slow dynamics of the system. The errors introduced by the estimated surface normal vectors are insignificant during normal operation of the robot with the dead band control.

Figure 7:
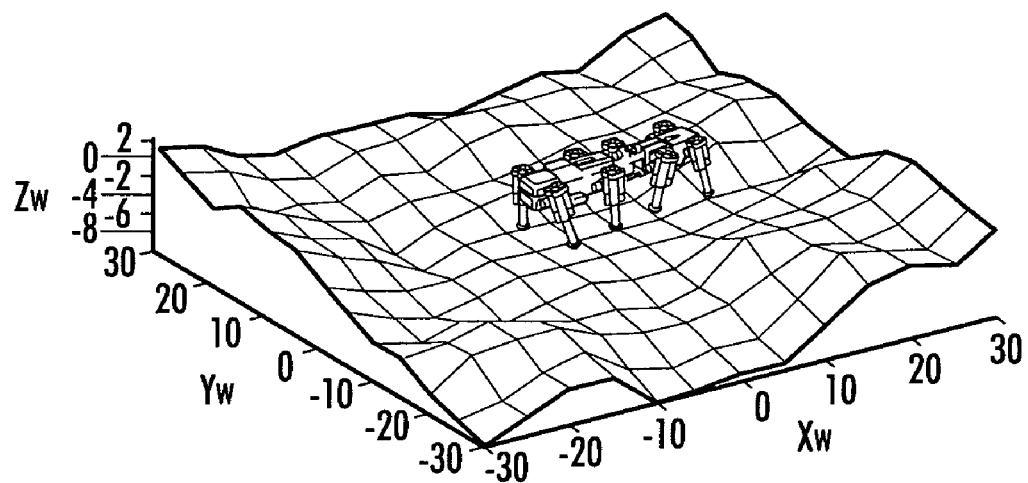
FIG. 7 is a graph showing results along Xw, Yx and Zw axes for a simulation used for tuning various controller parameters and determining performance weaknesses for a robot such as shown in FIG. 1.

The graph in FIG. 7 illustrates results along an Xw, Yx, and Zw axis during operation to aid in tuning various controller parameters and determining performance weaknesses of the robot 10.

As noted before, the final layer of the controller hierarchy is the step generator layer 86 and associated step generator 94 (CPG). The step generator 86,94 takes the foot position matrix P and the commanded heading $\vec{U}$ as inputs. A comparison between each foot and the desired heading is computed to determine which foot is the farthest from the commanded trajectory. This set is then filtered with regard to the support polygon 40, the adjacent feet in the air, and other factors to determine which foot should take the next step. Up to four feet can take a step at any given time, depending on pose and stability.

Figure 8:
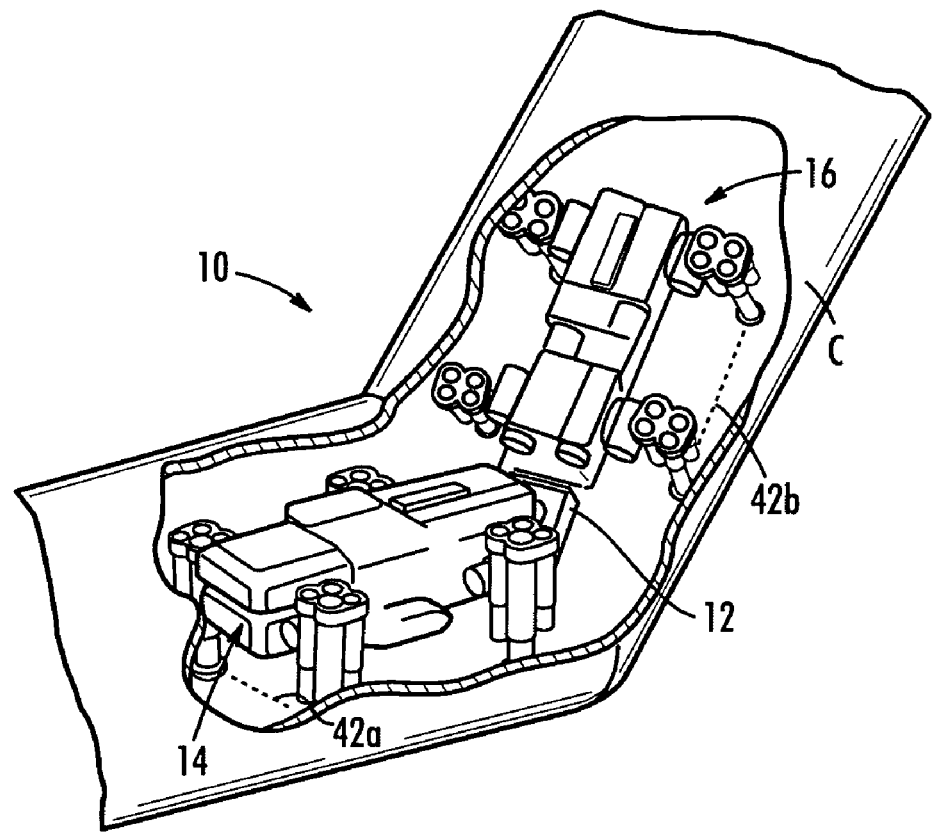
FIG. 8 is another isometric view of the robot such as shown in FIG. 1, illustrating the use of its articulating joint and multi-limbed legs for climbing a wall surface.

FIG. 8 is an isometric view of the robot, showing a fundamental use for the articulating joint 12 to allow the robot 10 to maneuver into a close confined space, for example, the illustrated pipe or conduit (C). As illustrated, the articulating joint 12 allows a more robust climbing performance through smaller apertures.

The liftoff phase of taking a step always sweeps the foot through a fixed reference point, with respect to (X, Y and Z) to bound integral step errors. The step downswing is terminated by ground detection at the force sensor 37. Continuous operation within the reachable workspace is ensured with these methods. Biological walking gaits (such as 4×4, modified tripod, and wave gaits) can emerge from this control scheme. The gait, however, is rapidly and dynamically modified when rough terrain is encountered.

Different mobility modes have been demonstrated with varying degrees of success. Fundamentally, the robot adequately tackled the terrain conditions. A top speed of about 40.6 mm/second was demonstrated over known, completely flat terrain. Rough terrain walking is much lower, however, on the scale of about 7.6 mm/second. Vertical climbing produced similar results to that of rough terrain.

Referring to the terrain elevation change along its trajectory as frequency, it was found that the robot had some difficulty handling terrain with a period of less than twice the length of the robot, for elevation amplitudes exceeding 40 mm. The articulating joint 12 had some problems simultaneously conforming to both the peaks and valleys encountered in shorter wavelengths.

The $C^2$ tether latency, as well as the mechanical gearing, could limit the overall speed of the system. Latency would affect the closed force loops by restricting the impact speed of the foot with the ground. The robot uses a fiber optic tether that aids in removing this problem. The subsequent restriction for faster walking is the linear speed of the shin joints. The maximum velocity that the leg could be linearly extended was calculated and experimentally verified to be about 19 mm/second. It is expected that a margin of mobility improvement could exceed 100% if this specific bottleneck is removed. However, vertical climbing loads increase the gearing requirements of the shin mechanism resulting in limited speed during normal walking modes. Alternate power density motors or active gear selection could be used to address this issue.

Currently, command and control between the robot and a host personal computer is handled by a high-speed fiber optic serial link. The power supply for any on-board electronics, such as the sensors, actuators, servoboards, CPLD, and other modules and units is sent down the tether. In one embodiment, the tether has copper wire bundled in an abrasion resistant sleeve with the fiber optic cable. The robot could use on-board lithium chemistry batteries that can power the robot for more than four hours. Miniature stereo vision for autonomous navigation and obstacle recognition can be used and the fiber optic serial link could be converted to a wireless link allowing the robot to roam free and unhindered.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A robot comprising:
    a robot body having a front half and a rear half and each half having opposing sides;
    a rotatable and driven three-degree-of-freedom articulating joint interconnecting the front half and rear half of the robot body and movable in an x,y,z movement;
    a plurality of multi-limbed legs extending from each side at each half of the robot body such that at least four multi-limbed legs extend from the front half and at least four multi-limbed legs extend from the rear half, each leg having a foot adapted to engage a ground surface to form a separate support polygon for each half of the robot body, each leg having driven limbs and joints to form said multi-limbed leg wherein each of said front half and rear half of the robot body can rotate about the articulating joint such that legs from one half can engage a surface as a support polygon that is opposite and vertically aligned with another surface to which legs from the other half engage; and
    an adaptive hierarchical controller operative with each leg and forming a layered behavioral control that includes a pose control layer that accounts for position and orientation with respect to a support polygon, a localized terrain follower layer that maps posture relative to terrain, a force control layer that accounts for ground contact within specified limits, and step generator layer that determines direction and magnitude of locomotion and translates trajectory to specific limb motions, wherein the controller is operative for
        a) determining the position and orientation of each half of the robot body with respect to a respective support polygon for the respective half of the robot body,
        b) mapping the posture of the robot body with respect to the ground surface via the articulating joint while maintaining ground contact for each foot that contributes to a respective support polygon for each half, and
        c) determining a direction and magnitude of locomotion and translating a trajectory of locomotion for the robot body to specific limb motions in each leg for allowing a six-degree of freedom motion and balance of the robot body over vertically aligned and parallel support polygons and vertically climbing between two opposing surfaces using each surface as a support polygon for a respective half of the robot body.

2. A robot according to claim 1, wherein said articulating joint is operative for rotation about the axes of an x,y,z coordinate system with joint angles that are a function of a current support polygon.

3. A robot according to claim 1, wherein each multi-limbed leg comprises limbs and joints forming a hip joint, a knee joint and a shin and foot assembly.

4. A robot according to claim 1, and further comprising a force sensor positioned at each leg and operatively connected to said controller for estimating contact forces on each leg.

5. A robot according to claim 4, wherein each foot is substantially spherical at a lower end engaging a ground surface to permit the estimation of radial reaction forces with respect to each leg.

6. A robot according to claim 1, wherein said controller is operative for computing a real time estimate of the ground surface and configuring the front half and rear half of the robot body to the ground surface via rotation about the articulating joint.

7. A robot according to claim 1, wherein said controller is operative for comparing a foot position matrix and commanded heading for each leg to determine which foot is positioned farthest from a trajectory.

8. A robot according to claim 1, wherein said controller is operative for commanding a leg to lift a foot through a fixed reference point with respect to the x,y,z coordinates to bound integral step errors.

9. A robot according to claim 1, and further comprising an accelerometer carried by the robot body and operatively connected to said controller for imparting signals representative of motion during rough terrain robot body movement, wherein said controller is operative for adjusting specific limb motions in each leg to compensate.

10. A robot according to claim 9, wherein said accelerometer comprises a MEMS accelerometer.

11. A robot comprising:
a robot body having a front half and a rear half and each half having opposing sides;
a rotatable and driven three-degree-of-freedom articulating joint interconnecting the front half and rear half of the robot body and movable in an x,y,z movement;
a plurality of multi-limbed legs extending from each side at each half of the robot body such that at least four multi-limbed legs extend from the front half and at least four multi-limbed legs extend from the rear half, each leg having limbs and joints forming a hip joint, a knee joint and a shin and foot assembly having a foot adapted to engage a ground surface to form a separate support polygon for each half of the robot body, wherein said articulating joint is operative to be driven in rotation about an x,y,z coordinate system with joint angles that are a function of a current support polygon wherein each of said front half and rear half of the robot body can rotate about the articulating joint such that legs from one half can engage a surface as a support polygon that is opposite and vertically aligned with another surface to which legs from the other half engage;
drive mechanisms carried in each leg and operatively connected to a respective hip joint, knee joint and a shin and foot assembly for imparting limb movement to carry the robot body over a ground surface including two separate support polygons; and
an adaptive hierarchical controller operatively connected to each drive mechanism within each leg and forming a layered behavioral control that includes a pose control layer that accounts for position and orientation with respect to a support polygon, a localized terrain follower layer that maps posture relative to terrain, a force control layer that accounts for ground contact within specified limits, and step generator layer that determines direction and magnitude of locomotion and translates trajectory to specific limb motions, and operative for
a) determining the position and orientation of each half of the robot body with respect to a respective support polygon for the respective half of the robot body,
b) mapping the posture of the robot body with respect to the ground surface via the articulating joint while maintaining ground contact for each foot that contributes to a respective support polygon for each half, and
c) determining a direction and magnitude of locomotion and translating a trajectory of locomotion for the robot body by driving the drive mechanisms in each leg for imparting specific limb motions in each leg and allowing a six-degree of freedom motion and balance of the robot body over vertically aligned and parallel support polygons and vertically climbing between two opposing surfaces using each for a surface as a support polygon respective half of the robot body.

12. A robot according to claim 11, and further comprising a force sensor positioned at each leg and operatively connected to said controller for estimating contact forces on each leg.

13. A robot according to claim 12, wherein each foot is substantially spherical at a lower end engaging a ground surface to permit the estimation of radial reaction forces with respect to each leg.

14. A robot according to claim 11, wherein said controller is operative for computing a real time estimate of the ground surface and configuring the front half and rear half of the robot body to the ground surface via rotation about the articulating joint.

15. A robot according to claim 11, wherein said controller is operative for comparing a foot position matrix and commanded heading for each leg to determine which foot is positioned farthest from a trajectory.

16. A robot according to claim 11, wherein said controller is operative for commanding a leg to lift a foot through a fixed reference point with respect to the x,y,z coordinates to bound integral step errors.

17. A robot according to claim 11, and further comprising an accelerometer carried by the robot body and operatively connected to said controller for imparting signals representative of motion during rough terrain robot body movement, wherein said controller is operative for adjusting specific limb motions in each leg.

18. A robot according to claim 17, wherein said accelerometer comprises a MEMS accelerometer.

19. A method of controlling a multi-limbed, multi-legged robot, which comprises:
determining the position and orientation of the robot formed as a robot body having a front half and a rear half and each half having opposing sides with respect to two separate support polygons formed from a plurality of multi-limbed legs extending from each side of the front half of the robot body and each side of the rear half of the robot body such that at least four multi-limbed legs extend from the front half and at least four multi-limbed legs extend from the rear half, each leg having a foot adapted to engage a ground surface for supporting the robot;
mapping the posture of the robot with respect to the ground surface via a three-degree-of-freedom articulating joint that divides the robot into the front half and a rear half and movable in an x,y,z movement such that the plurality of legs for each half engage the ground surface and create a separate support polygon for each half of the robot body while maintaining ground contact for each foot that contributes to the respective support polygon for each half of the robot body wherein each of said front half and rear half of the robot body can rotate about the articulating joint such that legs from one half can engage a surface as a support polygon that is opposite and vertically aligned with another surface to which legs from the other half engage; and determining a direction and magnitude of locomotion for the robot and translating a trajectory of locomotion for the robot to specific limb motions in each leg for allowing movement over vertically aligned and parallel support polygons in a six-degree of motion and balance and for vertically climbing between two opposing surfaces using each surface as a support polygon for a respective half of the robot body using an adaptive hierarchical controller with a layered behavioral control that includes a pose control layer that accounts for position and orientation with respect to a support polygon, a localized terrain follower layer that maps posture relative to terrain, a force control layer that accounts for ground contact within specified limits, and step generator layer that determines direction and magnitude of locomotion and translates trajectory to specific limb motions.

20. A method according to claim 19, which further comprises enabling rotation from the articulating joint about the axes of an x,y,z coordinate system with joint angles that are a function of a current support polygon.

21. A method according to claim 19, which further comprises forming each multi-limbed leg with a hip joint, a knee joint and a shin and foot assembly.

22. A method according to claim 19, which further comprises estimating contact forces on each leg through a force sensor positioned at each foot.

23. A method according to claim 19, which further comprises estimating radial reaction forces with respect to each foot based on a substantially spherical configured foot that contacts a ground surface.

24. A method according to claim 19, which further comprises computing a real time estimate of the ground surface and configuring the front half and rear half of the robot to the ground surface via rotation about the articulating joint.

25. A method according to claim 19, which further comprises comparing a foot position matrix and commanded heading for each leg to determine which foot is positioned farthest from a trajectory.

26. A method according to claim 19, which further comprises lifting a foot by moving the foot through a fixed reference point with respect to x,y,z coordinates to bound integral step errors.

* * * * *